US012385445B1

(12) United States Patent
Umehara et al.

(10) Patent No.: US 12,385,445 B1
(45) Date of Patent: Aug. 12, 2025

(54) INTERNAL COMBUSTION ENGINE CONTROL DEVICE

(71) Applicant: TOYOTA JIDOSHA KABUSHIKI KAISHA, Toyota (JP)

(72) Inventors: Kohei Umehara, Hadano (JP); Masato Ikemoto, Shizuoka-ken (JP); Hiroshi Kobayashi, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/965,179

(22) Filed: Dec. 2, 2024

(30) Foreign Application Priority Data

Feb. 5, 2024 (JP) ................................ 2024-015626

(51) Int. Cl.
*F02D 41/02* (2006.01)

(52) U.S. Cl.
CPC ...... *F02D 41/0255* (2013.01); *F01N 2430/06* (2013.01); *F01N 2900/1402* (2013.01)

(58) Field of Classification Search
CPC .................... F02D 41/0255; F01N 2900/1402
See application file for complete search history.

(56) References Cited

FOREIGN PATENT DOCUMENTS

DE 102023203419 A1 * 10/2024
JP 2013-072313 A 4/2013

* cited by examiner

*Primary Examiner* — Ngoc T Nguyen
(74) *Attorney, Agent, or Firm* — SoraIP, Inc.

(57) ABSTRACT

The internal combustion engine includes a fuel injection valve, a cylinder into which the fuel injected by the fuel injection valve is introduced, an exhaust passage through which the exhaust generated by the combustion of the fuel in the cylinder flows, a catalyst installed in the exhaust passage, an upstream air-fuel ratio sensor disposed upstream of the catalyst in the exhaust passage, and a downstream air-fuel ratio sensor disposed downstream of the catalyst in the exhaust passage. The processing circuit calculates a detection value difference which is a difference between detection values of the two air-fuel ratio sensors when the warm-up of the catalyst is completed. When the detection value difference is in the predetermined detection value difference range, the processing circuit lowers the warm-up completion temperature as compared with a case where the detection value difference is not in the detection value difference range.

5 Claims, 5 Drawing Sheets

INTERNAL COMBUSTION ENGINE CONTROL DEVICE

CROSS-REFERENCE TO RELATED APPLICATION

This application claims priority to Japanese Patent Application No. 2024-015626 filed on Feb. 5, 2024, incorporated herein by reference in its entirety.

BACKGROUND

1. Technical Field

The present disclosure relates to internal combustion engine control devices that are applied to spark ignition internal combustion engines.

2. Description of Related Art

Japanese Unexamined Patent Application Publication No. 2013-72313 (JP 2013-72313 A) discloses a control device that is applied to a spark ignition internal combustion engine. This internal combustion engine includes a catalyst installed in an exhaust passage, an upstream oxygen sensor disposed upstream of the catalyst in the exhaust passage, and a downstream oxygen sensor disposed downstream of the catalyst in the exhaust passage. The control device performs rich/lean control when warming up the catalyst by retarding the ignition timing. The control device determines the degree of activity of the catalyst based on the difference between the rich/lean cycles that can be acquired from detection values from the two oxygen sensors at this time.

SUMMARY

When the rich/lean control is performed, the proportion of unburned HC components in exhaust flowing into the catalytic increases. However, if the catalyst is not activated, the catalyst cannot control the exhaust. Therefore, if the rich/lean control is performed before the catalyst is activated, the properties of the exhaust flowing downstream of the catalyst in the exhaust passage deteriorate.

A first aspect of an internal combustion engine control device for solving the above issue is applied to a spark ignition internal combustion engine including a fuel injection valve that injects fuel containing gasoline, a cylinder into which the fuel injected from the fuel injection valve is introduced, an exhaust passage through which exhaust generated by combustion of the fuel in the cylinder flows, a catalyst installed in the exhaust passage, an upstream air-fuel ratio sensor disposed upstream of the catalyst in the exhaust passage, and a downstream air-fuel ratio sensor disposed downstream of the catalyst in the exhaust passage.

The internal combustion engine control device includes a processing circuit configured to perform a catalyst warm-up process when a temperature of the catalyst is lower than a warm-up completion temperature. The catalyst warm-up process is a process of increasing the temperature of the catalyst.

The processing circuit is configured to, when a proportion of a heavy component in the exhaust discharged from the cylinder to the exhaust passage is in a predetermined proportion range, set the warm-up completion temperature to a lower value than when the proportion is not in the proportion range.

A second aspect of an internal combustion engine control device for solving the above issue is applied to a spark ignition internal combustion engine including a fuel injection valve that injects fuel containing gasoline, a cylinder into which the fuel injected from the fuel injection valve is introduced, an exhaust passage through which exhaust generated by combustion of the fuel in the cylinder flows, a catalyst installed in the exhaust passage, an upstream air-fuel ratio sensor disposed upstream of the catalyst in the exhaust passage, and a downstream air-fuel ratio sensor disposed downstream of the catalyst in the exhaust passage.

The internal combustion engine control device includes a processing circuit configured to perform a catalyst warm-up process when a temperature of the catalyst is lower than a warm-up completion temperature. The catalyst warm-up process is a process of increasing the temperature of the catalyst.

The processing circuit is configured to calculate a detection value difference that is a difference between detection values from the two air-fuel ratio sensors when warm-up of the catalyst is completed, and when the detection value difference is in a predetermined detection value difference range, set the warm-up completion temperature to a lower value than when the detection value difference is not in the detection value difference range.

The above internal combustion engine control device is advantageous in that it can activate the catalyst at an early stage while reducing deterioration in properties of the exhaust.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of an internal combustion engine control device will be described with reference to FIG. 1 to FIG. 6.

Figure 1:
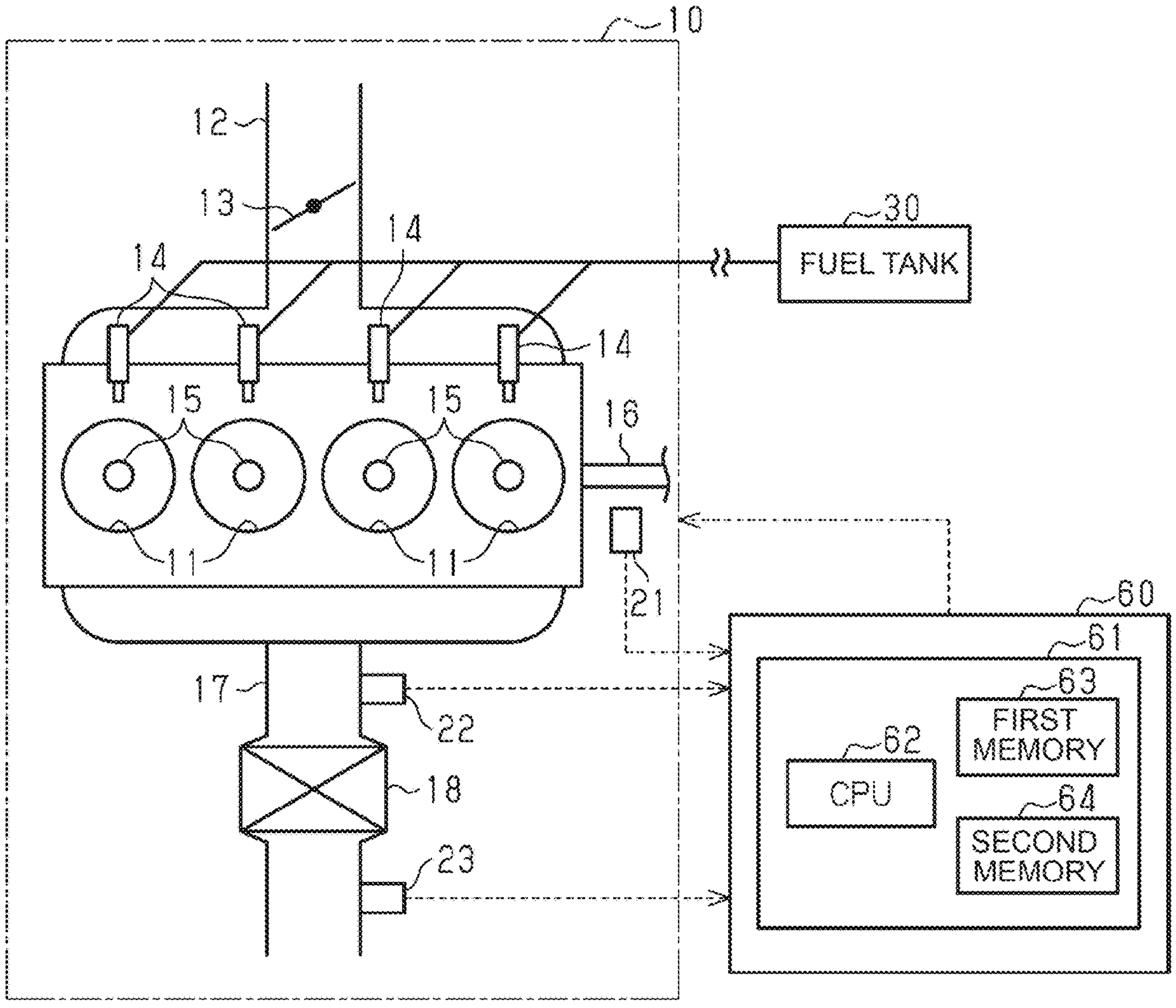
FIG. 1 is a schematic configuration diagram illustrating an embodiment of an internal combustion engine control device and an internal combustion engine to which the internal combustion engine control device is applied.

FIG. 1 illustrates a spark ignition type internal combustion engine 10 and a control device 60 applied to the internal combustion engine 10. The control device 60 corresponds to an “internal combustion engine control device”. The fuel used in the internal combustion engine 10 includes gasoline. That is, the fuel is a fuel containing at least gasoline among gasoline and alcohol.

Configuration of Internal Combustion Engine

The internal combustion engine 10 includes a plurality of cylinders 11, an intake passage 12, a plurality of fuel injection valves 14, a plurality of ignition devices 15, a crankshaft 16, and an exhaust passage 17.

The intake passage 12 is a passage through which air to be introduced into the plurality of cylinders 11 flows. A throttle valve 13 is installed in the intake passage 12. By adjusting the opening degree of the throttle valve 13, the intake air amount, which is the amount of air flowing through the intake passage 12, is adjusted.

The plurality of fuel injection valves 14 inject the fuel supplied from the fuel tank 30. The fuel injection valve 14 may be a port injection valve that injects fuel into the intake passage 12, or may be an in-cylinder injection valve that injects fuel into the cylinder 11. In the plurality of cylinders 11, an air-fuel mixture containing air and fuel is burned by the discharge of the ignition devices 15. The power obtained by the combustion of the air-fuel mixture is transmitted to the crankshaft 16, so that the crankshaft 16 rotates. In the plurality of cylinders 11, exhaust is generated by combustion of the air-fuel mixture. Such exhaust is discharged from the inside of the plurality of cylinders 11 to the exhaust passage 17.

In the exhaust passage 17, the exhaust discharged from the plurality of cylinders 11 flows. A catalyst 18 is installed in the exhaust passage 17. An example of the catalyst 18 is a three-way catalyst that reduces the exhaust flowing through the exhaust passage 17.

The internal combustion engine 10 includes a plurality of sensors. The plurality of sensors includes a crank angle sensor 21, an upstream air-fuel ratio sensor 22, and a downstream air-fuel ratio sensor 23. The crank angle sensor 21 outputs a signal corresponding to the rotational speed of the crankshaft 16. The upstream air-fuel ratio sensor 22 is disposed upstream of the catalyst 18 in the exhaust passage 17. The upstream air-fuel ratio sensor 22 detects the air-fuel ratio of the exhaust flowing toward the catalyst 18 as a detection value. The downstream air-fuel ratio sensor 23 is disposed downstream of the catalyst 18 in the exhaust passage 17. The downstream air-fuel ratio sensor 23 detects the air-fuel ratio of the exhaust that has passed through the catalyst 18 as a detection value.

Hereinafter, the rotational speed of the crankshaft 16 according to the output signal of the crank angle sensor 21 is referred to as an "engine rotational speed NE". The detection value from the upstream air-fuel ratio sensor 22 may be referred to as "upstream air-fuel ratio AF1", and the detection value from the downstream air-fuel ratio sensor 23 may be referred to as "downstream detection value AF2".

Figure 2:
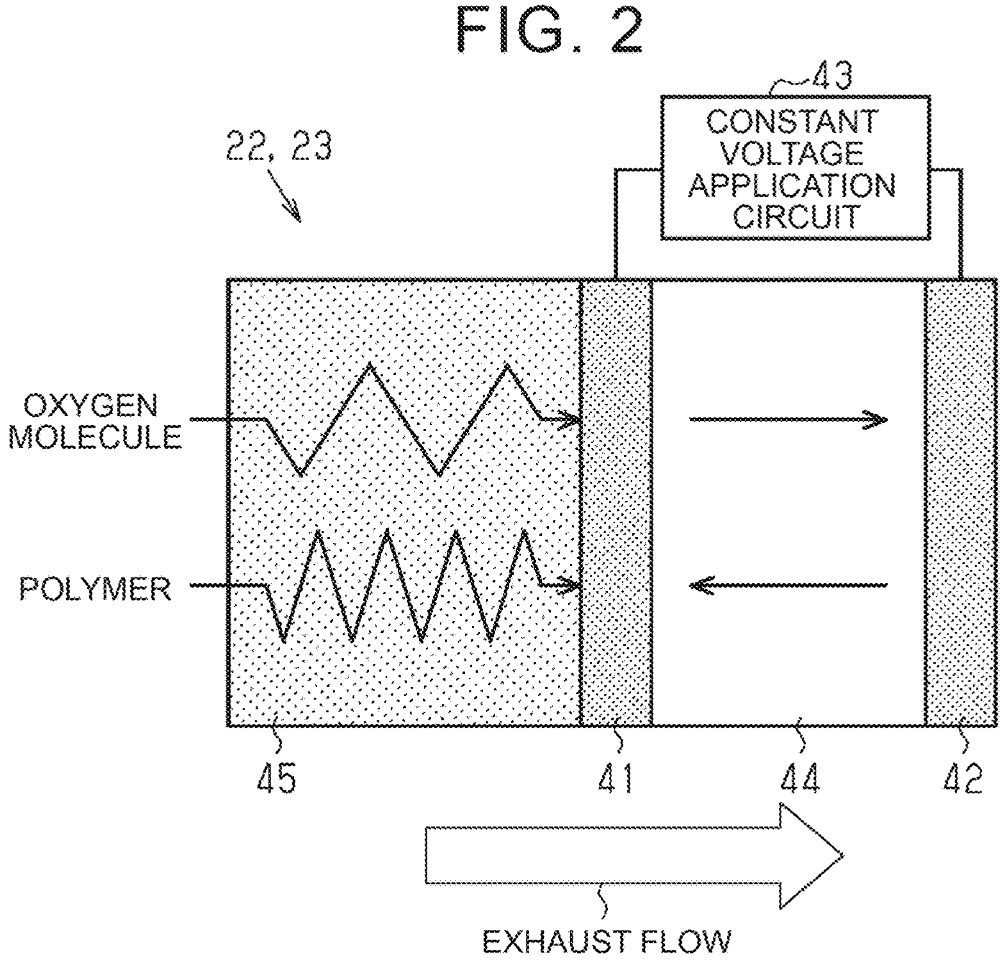
FIG. 2 is a schematic diagram illustrating an air-fuel ratio sensor in an internal combustion engine.

The air-fuel ratio sensors 22 and 23 will be described with reference to FIG. 2.

The air-fuel ratio sensors 22 and 23 are configured to be able to detect a deviation width of the air-fuel ratio of the exhaust from the stoichiometric air-fuel ratio. For example, the air-fuel ratio sensors 22 and 23 include a first electrode 41, a second electrode 42, and a constant voltage application circuit 43. The second electrode 42 is positioned downstream of the first electrode 41 in the direction in which the exhaust flows. A solid electrolyte layer 44 is provided between the first electrode 41 and the second electrode 42. The constant voltage application circuit 43 is operated so that a potential difference is generated between the first electrode 41 and the second electrode 42. Therefore, in the solid electrolyte layer 44, charge 15 transfer occurs between the first electrode 41 and the second electrode 42.

Further, a diffusion layer 45 is provided upstream of the first electrode 41 in the direction in which the exhaust flows. Therefore, the molecules contained in the exhaust pass through the diffusion layer 45 and reach the first electrode 41. The diffusion layer 45 is configured as a multiple network. Therefore, the passage time, which is the time required for the molecules to reach the first electrode 41 through the diffusion layer 45, varies depending on the size of the molecules. Specifically, when the passage time of the oxygen molecule is set as the "reference time TMb", the passage time TMh of the polymer larger than the oxygen molecule becomes longer than the reference time TMb. Therefore, the higher the proportion of the polymer in the exhaust, the smaller the molecular weight that reaches the first electrode 41 within the unit time. As a result, as the proportion of the polymer in the exhaust increases, the detection values of the air-fuel ratio sensors 22 and 23 are shifted to the lean side from the actual air-fuel ratio.

Control Device

As shown in FIG. 1, the control device 60 includes a processing circuit 61. An example of the processing circuit 61 is an electronic control unit. The processing circuit 61 includes a CPU 62, a first memory 63, and a second memory 64. The first memory 63 stores control programs executed by CPU 62. The second memory 64 stores CPU 62 computations. When CPU 62 executes the control program of the first memory 63, the processing circuit 61 controls the operation of the internal combustion engine 10.

Catalyst Warm-Up Process

When the catalyst 18 is not activated because the temperature of the catalyst 18 is low, the exhaust control capability of the catalyst 18 is not sufficiently exhibited. Therefore, the processing circuit 61 executes the catalyst warm-up processing when the catalytic temperature Tca, which is the temperature of the catalyst 18, is less than the warm-up completion temperature Tct. In the catalyst warm-up process, the processing circuit 61 increases the temperature of the exhaust discharged from the inside of the plurality of cylinders 11 to the exhaust passage 17 by retarding the ignition timing. Accordingly, the processing circuit 61 can increase the rate of increase of the catalytic temperature Tca.

The longer the execution time of the catalyst warm-up process, the worse the fuel efficiency of the internal combustion engine 10. Therefore, in order to suppress deterioration in fuel efficiency, it is preferable to shorten the execution time of the catalyst warm-up process. Therefore, the processing circuit 61 changes the warm-up completion temperature Tct in accordance with the properties of the fuel that is burned in the plurality of cylinders 11. For example, the processing circuit 61 determines whether the proportion of the heavy component in the exhaust is in a predetermined proportion range. When it is determined that the proportion of the heavy component is in the proportion range, the processing circuit 61 lowers the warm-up completion temperature Tct as compared with the case where it is determined that the proportion is not in the proportion component. For example, when determining that the proportion is not in the proportion range, the processing circuit 61 sets the reference temperature T1 to the warm-up completion temperature Tct. On the other hand, if it is determined that the proportion is in the proportion range, the processing circuit 61 sets the specified temperature T2 lower than the reference temperature T1 to the warm-up completion temperature Tct.

Here, referring to FIGS. 4A and 4B, the reason for changing the warm-up completion temperature Tct according to the proportion of the heavy component in the exhaust will be described.

Figure 4A:
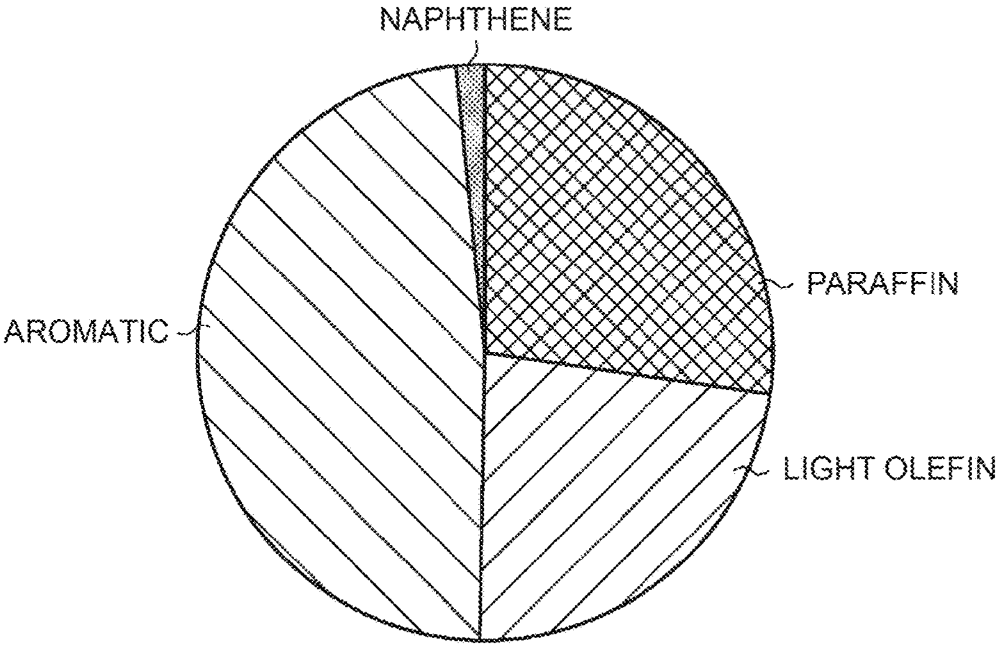
FIG. 4A is a diagrammatic representation of the proportions of various components of unburned HC components in exhaust air.
Figure 4B:
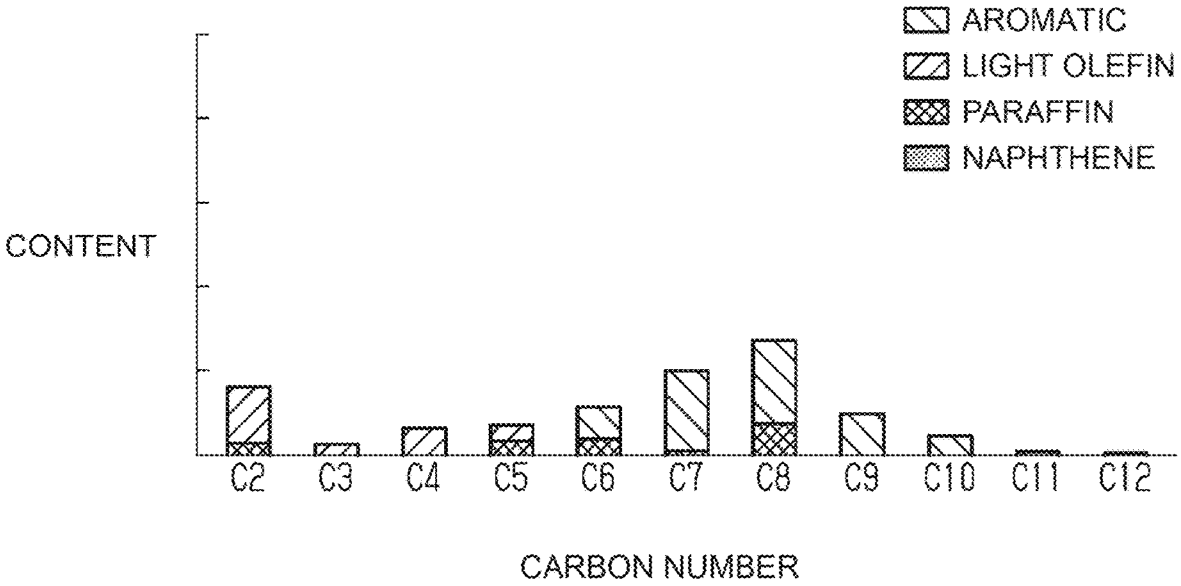
FIG. 4B is a graph showing the relation between the carbon-number and the content of various components.

As shown in FIG. 4A, the majority of unburned HC (hydrocarbons) components in the exhaust are paraffins, light olefins and aromatics. Although the unburned HC components comprise naphthenes, the naphthenes are very small. The proportion of paraffins is comparable to the proportion of light olefins. Here, a component having 7 or more carbon atoms is defined as a heavy component. As shown in FIG. 4B, the content of the light olefin is relatively high in the low-carbon components. However, in the case of heavy components, the aromatic content is high. Thus, the heavy component can be considered to be an aromatic.

When the catalytic temperature Tca is less than the warm-up completion temperature Tct, the unburned HC components contained in the exhaust are adsorbed on the surface of the catalyst 18. The unburned HC components adsorbed to the catalyst 18 have a poisoning effect. The degree of poisoning depends on the type of unburned HC components. For example, while light olefins and aromatics have no poisoning effects, paraffins have poisoning effects.

The activation temperature, which is the temperature of the catalyst 18 serving as a criterion for determining whether or not the catalyst 18 has been activated, varies depending on the unburned HC components. Specifically, among paraffins, light olefins, and aromatics, the activation temperature required by the light olefin is the lowest. The aromatic require a second lowest activation temperature. Paraffin requires the highest activation temperature. Therefore, the warm-up completion temperature Tct may be appropriately set depending on the unburned HC components. That is, the more components that require a lower activation temperature, the lower the appropriate warm-up completion temperature Tct.

As shown in FIG. 4A, the proportions of paraffins and light olefins in the unburned HC components are comparable. Therefore, when the proportion of aromatics is known, an appropriate value of the warm-up completion temperature Tct is known.

As mentioned above, the heavy component of the exhaust can be regarded as an aromatic. Heavy components of the exhaust, such as aromatics, are molecules of larger size than oxygen molecules, i.e., the polymeric components described above. Therefore, the higher the proportion of the aromatics in the exhaust discharged from the plurality of cylinders 11 to the exhaust passage 17, the first air-fuel ratio AF1, which is the detection value from the upstream air-fuel ratio sensor 22, is shifted to a leaner value than the actual air-fuel ratio.

When the catalyst 18 is activated, the exhaust that has passed through the catalyst 18 contains few aromatics because the catalyst 18 can control the exhaust. Therefore, the second air-fuel ratio AF2, which is the detection value from the downstream air-fuel ratio sensor 23, does not deviate from the actual air-fuel ratio to the lean-side value. Therefore, it can be inferred that the larger the detection value difference, which is the difference between the first air-fuel ratio AF1 and the second air-fuel ratio AF2, is, the higher the proportion of aromatics in the exhaust discharged from the plurality of cylinders 11 to the exhaust passage 17 is. When the proportion of the aromatics in the exhaust discharged from the plurality of cylinders 11 to the exhaust passage 17 is defined as "aromatics proportion Ra", the warm-up completion temperature Tct can be set based on the aromatics proportion Ra.

Warm-Up Completion Temperature Setting Process

Figure 3:
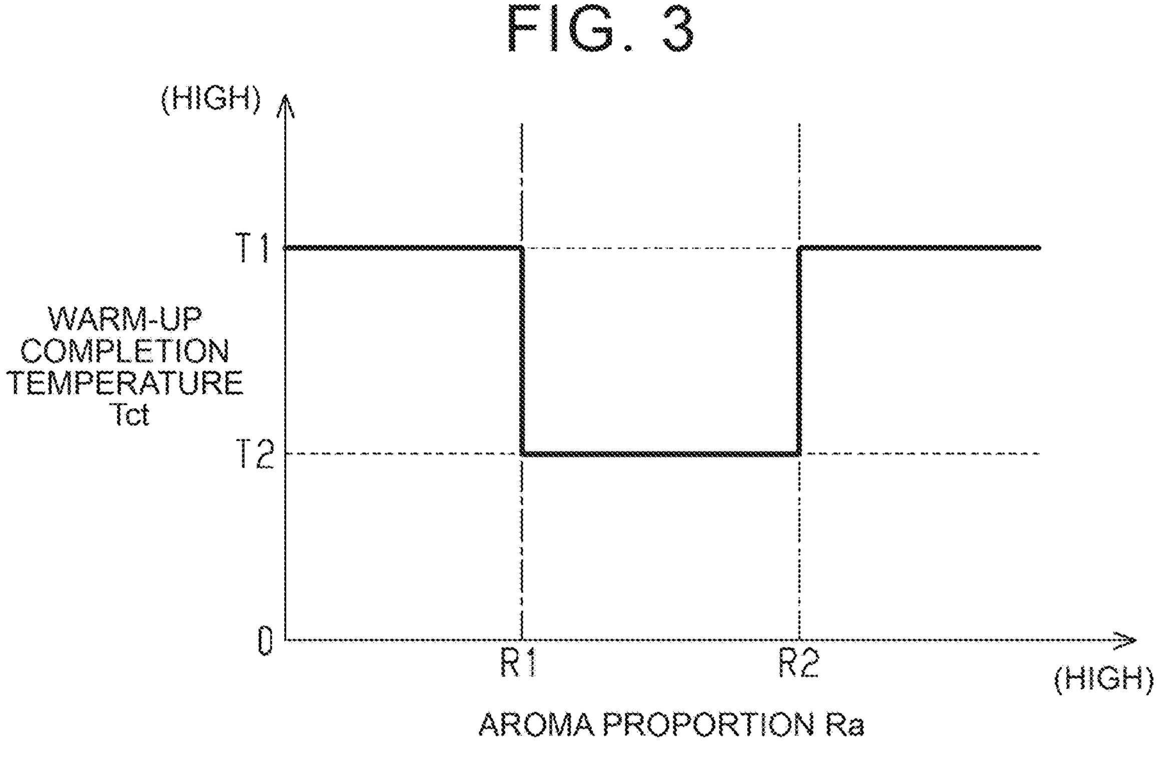
FIG. 3 is a diagram illustrating a relationship between an aromatics proportion and a warm-up completion temperature.
Figure 5:
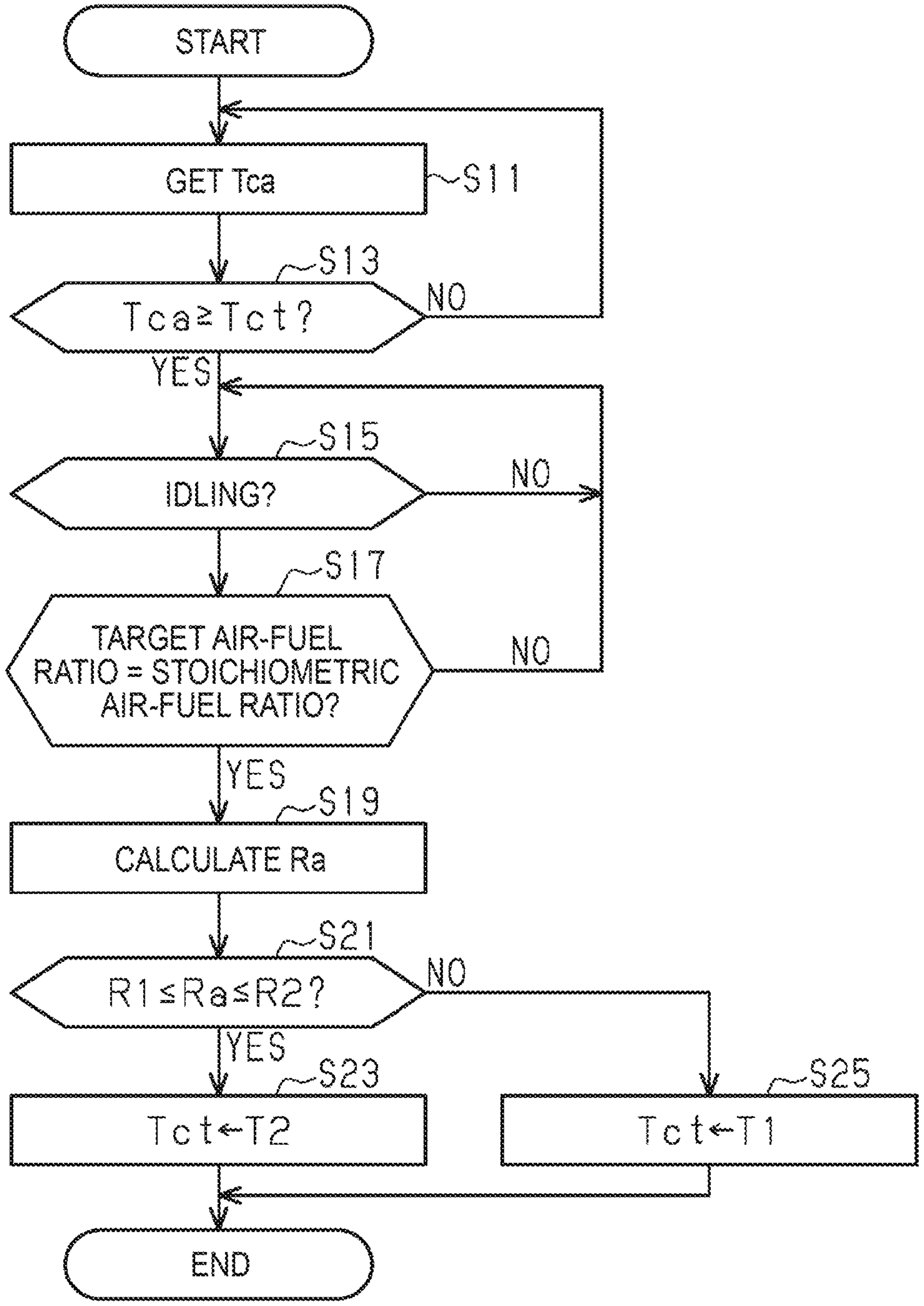
FIG. 5 is a flow chart showing a series of processes for setting a warm-up completion temperature.

Referring to FIGS. 3 and 5, a series of processing executed by the processing circuit 61 to set the warm-up completion temperature Tct will be described. The processing circuit 61 executes a series of processing illustrated in FIG. 5 on condition that both of the two air-fuel ratio sensors 22 and 23 are activated.

In S11, the processing circuit 61 obtains the catalytic temperature Tca. When the internal combustion engine 10 includes a sensor for detecting the temperature of the catalyst 18, the processing circuit 61 acquires the temperature corresponding to the detection signal of the sensor as the catalytic temperature Tca. In the subsequent S13, the processing circuit 61 determines whether the catalytic temperature Tca is greater than or equal to the warm-up completion temperature Tct. When the catalytic temperature Tca is equal to or higher than the warm-up completion temperature Tct, it is assumed that the catalyst 18 is activated. On the other hand, when the catalytic temperature Tca is less than the warm-up completion temperature Tct, it is considered that the catalyst 18 is not yet activated. When the catalytic temperature Tca is equal to or higher than the warm-up completion temperature Tct (S13: YES), the processing circuit 61 shifts the processing to S15. On the other hand, when the catalytic temperature Tca is less than the warm-up completion temperature Tct (S13: NO), the processing circuit 61 shifts the processing to S11.

In S15, the processing circuit 61 determines whether the internal combustion engine 10 is idling. For example, if the engine speed NE is substantially equal to the idle speed, the processing circuit 61 may determine that the internal combustion engine 10 is idling. The idle speed is a target of the engine speed during idling. When the processing circuit 61 determines that the internal combustion engine 10 is idling (S15: YES), the processing proceeds to S17. On the other hand, when it is determined that the internal combustion engine 10 is not idling (S15: NO), the processing circuit 61 repeats the determination of S15 until it can be determined that the internal combustion engine 10 is idling.

In S17, the processing circuit 61 determines whether the target air-fuel ratio is set to the stoichiometric air-fuel ratio. When the target air-fuel ratio is set to the stoichiometric air-fuel ratio (S17: YES), the processing circuit 61 shifts the processing to S19. On the other hand, when the target air-fuel ratio is set to an air-fuel ratio that differs from the stoichiometric air-fuel ratio (S17: NO), the processing circuit 61 shifts the processing to S15.

In S19, the processing circuit 61 calculates the aromatics proportion Ra. The processing circuit 61 calculates, as the aromatics proportion Ra, a detection value difference that is a difference between the first air-fuel ratio AF1, which is a detection value from the upstream air-fuel ratio sensor 22, and the second air-fuel ratio AF2, which is a detection value from the downstream air-fuel ratio sensor 23. In the following S21, the processing circuit 61 determines whether the aromatics proportion Ra is in a predetermined detection value difference range.

As shown in FIG. 3, the lower limit of the detection value difference range is the aromatics proportion lower limit value R1, and the upper limit of the detection value difference range is the aromatics proportion upper limit value R2. The detection value difference range corresponds to the above-described proportion range. Therefore, when the aromatics proportion Ra is in the detection value difference range, it can be determined that the proportion of the heavy component in the exhaust is in the predetermined proportion range. On the other hand, when the aromatics proportion Ra is not in the detection value difference range, it can be determined that the proportion of the heavy component in the exhaust is not in the predetermined proportion range.

The paraffins contained in the unburned HC components are less flammable than light olefins and aromatics. The smaller the aromatics proportion Ra, the higher the proportion of paraffin in the unburned HC components occupied. Since the unburned HC components adsorbed to the catalyst 18 are less likely to burn, the catalyst 18 is less likely to be activated if the proportion of the unburned HC components to paraffin is large. Therefore, the aromatics proportion lower limit value R1 is set as a criterion for determining whether the proportion of paraffin in the unburned HC components is high.

Light olefins, on the other hand, are more flammable than aromatics. The larger the aromatics proportion Ra, the smaller the proportion of light olefins among the unburned HC components. Therefore, as the aromatics proportion Ra increases, the unburned HC components adsorbed to the catalyst 18 are less likely to burn, and thus the catalyst 18 is less likely to be activated. Therefore, the aromatics proportion upper limit value R2 is set as a criterion for determining whether the proportion of light olefins in the unburned HC components is small.

Returning to FIG. 5, in S21, when the aromatics proportion Ra is in the detection value difference range (S21: YES), the processing circuit 61 shifts the processing to S23. In S23, the processing circuit 61 sets the specified temperature T2 to the warm-up completion temperature Tct. Then, the processing circuit 61 ends the series of processing.

On the other hand, when the aromatics proportion Ra is not in the detection value difference range (S21: NO), the processing circuit 61 shifts the processing to S25. In S25, the processing circuit 61 sets the reference temperature T1 to the warm-up completion temperature Tct. Then, the processing circuit 61 ends the series of processing.

Processing at Start of Internal Combustion Engine

Figure 6:
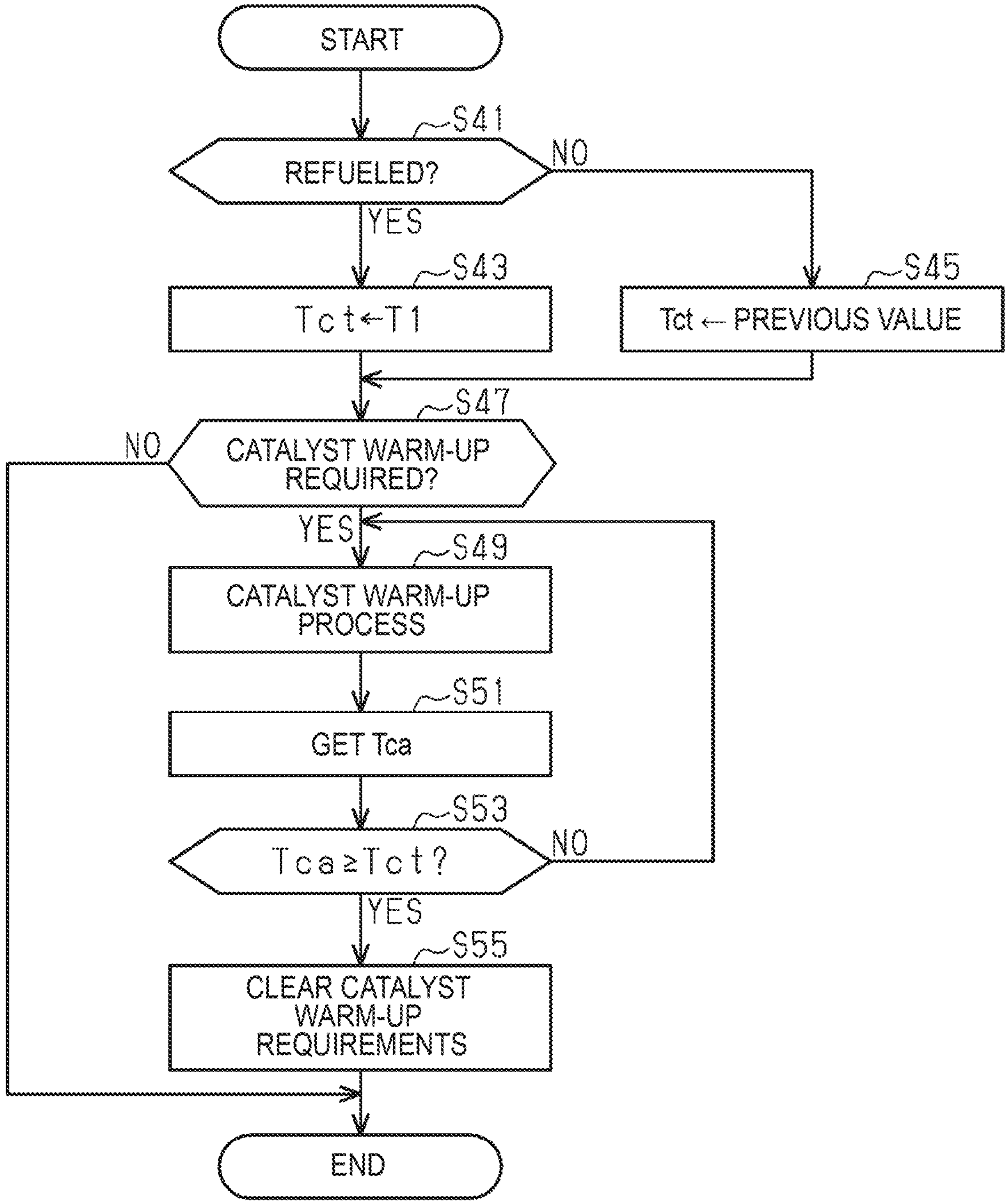
FIG. 6 is a flowchart showing a series of processes when the catalyst warm-up process is executed at the time of starting the internal combustion engine.

A series of processes executed by the processing circuit 61 when the internal combustion engine 10 is started will be described with reference to FIG. 6.

In S41, the processing circuit 61 determines whether or not the lubrication has been performed from the time when the operation of the internal combustion engine 10 was stopped last time to the time of the current start. When the processing circuit 61 determines that the refueling has been performed (S41: YES), the processing proceeds to S43. On the other hand, when the processing circuit 61 determines that the refueling is not performed (S41: NO), the processing proceeds to S45.

In S43, the processing circuit 61 sets the reference temperature T1 to the warm-up completion temperature Tct. Then, the processing circuit 61 shifts the processing to S47.

In S45, the processing circuit 61 sets the previous value to the warm-up completion temperature Tct. The previous value is the warm-up completion temperature Tct at the time when the operation of the internal combustion engine 10 is stopped last time. Then, the processing circuit 61 shifts the processing to S47.

In S47, the processing circuit 61 determines whether there is a warm-up demand for the catalyst 18. When both of the fact that the catalytic temperature Tca is less than the warm-up completion temperature Tct and the fact that there is no request to rapidly increase the engine speed NE are satisfied, it can be determined that there is a warm-up request. On the other hand, when the catalytic temperature Tca is equal to or higher than the warm-up completion temperature Tct or there is a request to rapidly increase the engine speed NE, it can be determined that there is no warm-up request. If it is determined that there is a warm-up request (S47: YES), the processing circuit 61 shifts the processing to S49. On the other hand, if it is determined that there is no warm-up request (S47: NO), the processing circuit 61 ends the series of processing.

In S49, the processing circuit 61 executes the catalyst warm-up process. In the following S51, the processing circuit 61 obtains the catalytic temperature Tca in the same manner as in the above S11. In the subsequent S53, the processing circuit 61 determines whether the catalytic temperature Tca is greater than or equal to the warm-up completion temperature Tct. When the catalytic temperature Tca is equal to or higher than the warm-up completion temperature Tct (S53: YES), it can be considered that the warm-up of the catalyst 18 is completed, and therefore, the processing circuit 61 shifts the processing to S55. On the other hand, when the catalytic temperature Tca is less than the warm-up completion temperature Tct (S53: NO), it is considered that the warm-up of the catalyst 18 is not completed, and therefore, the processing circuit 61 shifts the processing to S49. That is, the processing circuit 61 continues the catalyst warm-up processing.

In S55, the processing circuit 61 clears the warm-up requirement of the catalyst 18. When the catalyst warm-up process is terminated as described above, the processing circuit 61 terminates the series of processes.

Operation and Effect of Present Embodiment (1) When warm-up of the catalyst 18 is completed while the internal combustion engine 10 is in operation, the processing circuit 61 calculates the detection value difference as the aromatics proportion Ra. When the aromatics proportion Ra is in the detection value difference range, the processing circuit 61 lowers the warm-up completion temperature Tct as compared with the case where the aromatics proportion Ra is not in the detection value difference range.

When the aromatics proportion Ra is in the detection value difference range, it can be determined that the proportion of the heavy component in the exhaust discharged from the plurality of cylinders 11 to the exhaust passage 17 is in the predetermined proportion range. Therefore, in such a case, the processing circuit 61 sets a lower temperature to the warm-up completion temperature Tct than in a case where it can be determined that the proportion of the heavy component is not in the predetermined proportion range. Thus, in a case where the catalyst warm-up process is executed at the next start of the internal combustion engine 10, the processing circuit 61 can complete the catalyst warm-up process at an early stage. Moreover, as compared with the case where the lean/rich control is performed in a state where the catalyst 18 is not yet activated, the properties of the exhaust flowing downstream of the catalyst 18 in the exhaust passage 17 do not deteriorate.

Therefore, the control device 60 can activate the catalyst 18 at an early stage while suppressing deterioration in the properties of the exhaust discharged from the exhaust passage 17.

(2) When the internal combustion engine 10 is idling, the quantity of the fuel introduced into the plurality of cylinders 11 is more stable than when the engine speed NE is changing. As a result, the air-fuel ratio is stable. Therefore, in the control device 60, the processing circuit 61 calculates the detection value difference as the aromatics proportion Ra when the internal combustion engine 10 is idling and the warm-up of the catalyst 18 is completed. The processing circuit 61 uses the aromatics proportion Ra to set the warm-up completion temperature Tct. Therefore, the control device 60 can increase the accuracy of setting the warm-up completion temperature Tct.

(3) When the fuel introduced into the plurality of cylinders 11 changes, the proportion of heavy components in the exhaust discharged from the plurality of cylinders 11 to the exhaust passage 17 may change. The phrase "the fuel introduced into the plurality of cylinders 11 changes" as used herein includes that fuel with a different proportion of alcohol is introduced into the cylinders 11. During a period in which the operation of the internal combustion engine 10 is stopped, fuel with a different proportion of alcohol may be supplied to the fuel tank 30.

Therefore, the processing circuit 61 sets the reference temperature T1 to the warm-up completion temperature Tct when the refueling is performed from the time when the previous operation of the internal combustion engine 10 is ended to the time when the internal combustion engine 10 is started. That is, after the warm-up completion temperature Tct is lowered, the processing circuit 61 releases the condition in which the warm-up completion temperature Tct is lowered when it is detected that the fuel has been supplied. Thus, the control device 60 can suppress the catalyst warm-up process from being finished before the catalyst 18 is activated.

Modification

The above-described embodiment can be modified as follows. The above-described embodiments and the following modifications can be implemented in combination with each other as long as they are not technically contradictory.

- The processing circuit 61 does not necessarily set the reference temperature T1 to the warm-up completion temperature Tct provided that the refueling has been performed.
- In the series of processes illustrated in FIG. 5, the determination of S15 may be omitted. If the catalyst 18 is activated, the processing circuit 61 may calculate the aromatics proportion Ra when the internal combustion engine 10 is not idling.
- The processing circuit 61 may employ a method different from the method of retarding the ignition timing as long as the temperature of the catalyst 18 can be increased in the catalyst warm-up process. For example, the processing circuit 61 may heat the catalyst 18 with a heater or the like, or may heat the catalyst 18 by energization.

What is claimed is:

1. An internal combustion engine control device that is applied to a spark ignition internal combustion engine including a fuel injection valve that injects fuel containing gasoline, a cylinder into which the fuel injected from the fuel injection valve is introduced, an exhaust passage through which exhaust generated by combustion of the fuel in the cylinder flows, a catalyst installed in the exhaust passage, an upstream air-fuel ratio sensor disposed upstream of the catalyst in the exhaust passage, and a downstream air-fuel ratio sensor disposed downstream of the catalyst in the exhaust passage, the internal combustion engine control device comprising a processing circuit configured to perform a catalyst warm-up process when a temperature of the catalyst is lower than a warm-up completion temperature, the catalyst warm-up process being a process of increasing the temperature of the catalyst, wherein the processing circuit is configured to, when a proportion of a heavy component in the exhaust discharged from the cylinder to the exhaust passage is in a predetermined proportion range, set the warm-up completion temperature to a lower value than when the proportion is not in the proportion range.

2. An internal combustion engine control device that is applied to a spark ignition internal combustion engine including a fuel injection valve that injects fuel containing gasoline, a cylinder into which the fuel injected from the fuel injection valve is introduced, an exhaust passage through which exhaust generated by combustion of the fuel in the cylinder flows, a catalyst installed in the exhaust passage, an upstream air-fuel ratio sensor disposed upstream of the catalyst in the exhaust passage, and a downstream air-fuel ratio sensor disposed downstream of the catalyst in the exhaust passage, the internal combustion engine control device comprising a processing circuit configured to perform a catalyst warm-up process when a temperature of the catalyst is lower than a warm-up completion temperature, the catalyst warm-up process being a process of increasing the temperature of the catalyst, wherein the processing circuit is configured to calculate a detection value difference that is a difference between detection values from the two air-fuel ratio sensors when warm-up of the catalyst is completed, and when the detection value difference is in a predetermined detection value difference range, set the warm-up completion temperature to a lower value than when the detection value difference is not in the detection value difference range.

3. The internal combustion engine control device according to claim 2, wherein the processing circuit is configured to calculate the detection value difference when the internal combustion engine is idling and the warm-up of the catalyst is completed.

4. The internal combustion engine control device according to claim 1, wherein the processing circuit is configured to stop setting the warm-up completion temperature to the lower value when refueling is detected after the warm-up completion temperature is set to the lower value.

5. The internal combustion engine control device according to claim 2, wherein the processing circuit is configured to stop setting the warm-up completion temperature to the lower value when refueling is detected after the warm-up completion temperature is set to the lower value.

* * * * *